US012197144B2

(12) United States Patent
Nakamura

(10) Patent No.: US 12,197,144 B2
(45) Date of Patent: Jan. 14, 2025

(54) IMAGE FORMING APPARATUS

(71) Applicant: CANON KABUSHIKI KAISHA, Tokyo (JP)

(72) Inventor: Yutaro Nakamura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/387,173

(22) Filed: Nov. 6, 2023

(65) Prior Publication Data

US 2024/0152071 A1 May 9, 2024

(30) Foreign Application Priority Data

Nov. 8, 2022 (JP) ................................ 2022-178719

(51) Int. Cl.
*G03G 15/06* (2006.01)

(52) U.S. Cl.
CPC ................................ *G03G 15/065* (2013.01)

(58) Field of Classification Search
CPC ................................ G03G 15/065
USPC ................................ 399/38, 53, 55
See application file for complete search history.

(56) References Cited

U.S. PATENT DOCUMENTS 8,977,150 B2 * 3/2015 Yamamoto ............ G03G 15/22
399/53
9,411,260 B2 8/2016 Mitsui et al.

FOREIGN PATENT DOCUMENTS

JP H11-52689 A 2/1999
JP 2014-092636 A 5/2014
JP 2015-175993 A 10/2015
JP 2016-126247 A 7/2016

* cited by examiner

*Primary Examiner* — Hoan H Tran
(74) *Attorney, Agent, or Firm* — VENABLE LLP

(57) ABSTRACT

An image forming apparatus forms an image on a recording material using a developer charged with a regular polarity. In a first period, a voltage is applied such that an electrostatic force acts on the developer charged with the regular polarity in a direction from a supply member toward a developer carrying member, and in a second period, a voltage is applied such that an electrostatic force acts on the developer charged with the regular polarity in a direction from the developer carrying member toward the supply member, a polarity of a regulation voltage is equal to the regular polarity, an absolute value of the regulation voltage is greater than an absolute value of a regulation voltage in the first period, and a difference between a development voltage and the regulation voltage is greater than a difference between the development voltage and a supply voltage.

10 Claims, 5 Drawing Sheets

IMAGE FORMING APPARATUS

BACKGROUND OF THE INVENTION

Field of the Invention

The present invention relates to an image forming apparatus.

Description of the Related Art

In an image forming apparatus that develops an electrostatic latent image formed on a photosensitive drum with toner carried on a development roller, residual development toner may remain on the development roller without being used for development. The residual development toner is stripped off the development roller through mechanical rubbing with a supply roller at a contact portion with the supply roller. However, minute toner among the residual development toner may not return to the supply roller through the mechanical rubbing and may remain on the development roller. In this case, it becomes difficult for the toner supplied from the supply roller to coat the surface of the development roller, and the amount of toner carried on the development roller becomes uneven or insufficient, which may result in an image defect with low density. As a countermeasure against this, it is conceivable to control supply voltage and development voltage applied to the supply roller and the development roller, respectively, such that an electrostatic force acts on the residual development toner in a direction from the development roller to the supply roller. Specifically, in a case where a regular polarity of the toner is negative, the supply voltage is made to be a higher potential than the development voltage (the absolute value of the supply voltage is made smaller than the absolute value of the development voltage). By performing such voltage control (referred to as stripping voltage control), it is possible to strip off the minute toner from the surface of the development roller.

In the description of Japanese Patent Application Laid-Open No. 2015-175993, stripping voltage control is performed in a period from the end timing of image formation on a recording material to the start timing of image formation on the next recording material (referred to as a sheet interval) in a case where images are formed continuously on a plurality of recording materials.

There is an image forming apparatus provided with a regulating blade that comes into contact with the surface of a development roller to regulate the layer thickness of toner on the surface of the development roller. Toner coating on the surface of the development roller in a region on a downstream side of a contact position with a supply roller and an upstream side of a contact position with the regulating blade in a rotational direction of the development roller is referred to as pre-coating. When the stripping voltage control is performed in the sheet interval in the case of continuous image formation, the pre-coating may not be sufficiently formed. In a state where the pre-coating is not sufficient, when toner charged with an opposite polarity is generated on the surface of the development roller due to deterioration of the toner (in a case where the regular polarity is negative, toner having a positive polarity; also referred to as positive toner), the positive toner may be fused to the tip end portion of the regulating blade. When the toner is fused to the tip end portion of the regulating blade, an image defect in which a streak appears in an image formed by scraping off toner from the surface of the development roller may occur (referred to as a development streak).

SUMMARY OF THE INVENTION

The present invention has been made in view of this problem and provides an image forming apparatus capable of suppressing image damage in a configuration in which a potential difference is provided between a supply roller and a development roller.

The present invention is an image forming apparatus that forms an image on a recording material using a developer charged with a regular polarity, comprising:

- an image bearing member on which an electrostatic latent image is formed;
- a developer carrying member that develops the electrostatic latent image formed on the image bearing member with the developer;
- a supply member that supplies the developer to the developer carrying member;
- a regulation member that regulates a layer thickness of the developer carried on the developer carrying member;
- an application unit that applies a voltage to each of the developer carrying member, the supply member, and the regulation member; and
- a control unit that controls application of the voltage performed by the application unit, wherein the control unit

- controls, in a first period, application of the voltage such that an electrostatic force acts on the developer charged with the regular polarity in a direction from the supply member toward the developer carrying member, and
- controls, in a second period, application of the voltage such that an electrostatic force acts on the developer charged with the regular polarity in a direction from the developer carrying member toward the supply member, a polarity of a regulation voltage applied to the regulation member is equal to the regular polarity, an absolute value of the regulation voltage is greater than an absolute value of a regulation voltage applied to the regulation member in the first period, and a difference between a development voltage applied to the developer carrying member and the regulation voltage is greater than a difference between the development voltage and a supply voltage applied to the supply member.

According to the image forming apparatus of the present invention, image damage can be suppressed in the configuration in which a potential difference is provided between the supply roller and the development roller.

Further features of the present invention will become apparent from the following description of exemplary embodiments with reference to the attached drawings.

DESCRIPTION OF THE EMBODIMENTS

An embodiment of an image forming apparatus according to the present invention will be described in detail below with reference to the drawings. The following description is not intended to limit the scope of the invention. Dimensions, materials, shapes, control values, and the like in the following description are shown as examples for carrying out the present invention unless otherwise specified.

Overall Configuration and Operation of Image Forming Apparatus

Figure 1:
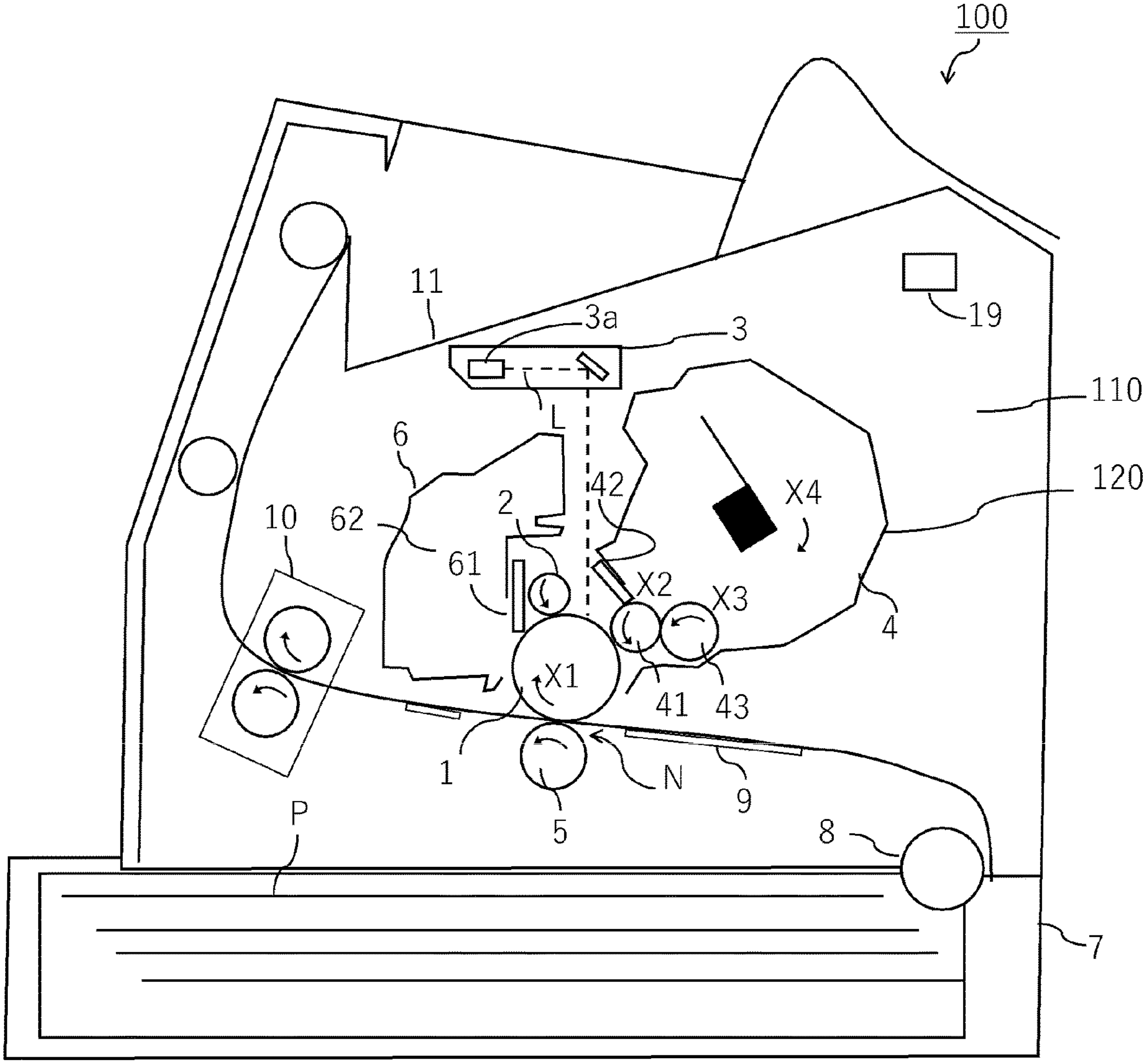
FIG. 1 is a schematic cross-sectional view of an image forming apparatus in an embodiment.

FIG. 1 is a schematic cross-sectional view of an image forming apparatus according to Example 1 of the present invention. An image forming apparatus 100 of Example 1 is a laser beam printer that forms an image using an electrophotographic system. This image forming apparatus 100 uses a cartridge system, and a process cartridge 120 is detachable from an apparatus main body 110.

The image forming apparatus 100 is connected to an external host device such as a personal computer or an image reading device, receives image information from the host device, and forms an image on a recording material (a recording medium, a transfer material) according to the image information for output (printing). A sheet material such as paper is preferably used as the recording material.

The image forming apparatus 100 has a photosensitive drum 1 which is an electrophotographic photosensitive member (a photosensitive member) of a drum shape (a cylindrical shape) as an image bearing member. Around the photosensitive drum 1, the following means are disposed in order in a rotation direction thereof. First, a charging roller 2, which is a roller-shaped charging member, is disposed as a charging means. Next, an exposure device (a laser scanner unit) 3 is disposed as an exposure means. Next, a development unit 4 is disposed as a development means. Next, a transfer roller 5, which is a roller-shaped transfer member, is disposed as a transfer means. Next, a cleaning device 6 is disposed as a cleaning means.

When a print start signal is input to the image forming apparatus 100 and image formation is started, the photosensitive drum 1 receives a rotational driving force from a driving motor (not shown) as a driving means provided in the apparatus main body 110. As a result, the photosensitive drum 1 is rotationally driven in a direction of an arrow X1 in the figure at a predetermined peripheral speed (a process speed) (for example, 300 mm/s). In Example 1, the photosensitive drum 1 has a drum substrate made of aluminum and an OPC photosensitive layer provided on the drum substrate. The charging roller 2 is disposed in contact with the photosensitive drum 1 and rotates with the rotation of the photosensitive drum 1. The surface (the outer peripheral surface) of the rotating photosensitive drum 1 is substantially uniformly charged to a predetermined potential with a predetermined polarity (a negative polarity in Example 1) by the charging roller 2. At this time, a predetermined charging voltage is applied to the charging roller 2 from a charging power supply (a high voltage power supply) (not shown) provided in the apparatus main body 110.

The charged surface of the photosensitive drum 1 is exposed with laser light L from the exposure device 3 according to image information. The exposure device 3 outputs, from a laser output portion 3*a*, laser light (an exposure beam) L modulated to correspond to a time-series electric digital image signal of the image information input to the control unit 19 from a personal computer or the like (not shown) external to the image forming apparatus 100. The laser light L output from the exposure device 3 enters the process cartridge 120 and is emitted to the surface of the photosensitive drum 1. The substantially uniformly charged surface of the photosensitive drum 1 is scanned and exposed with the laser light L, and as a result, an electrostatic latent image (an electrostatic image) corresponding to the image information is formed on the surface of the photosensitive drum 1.

The electrostatic latent image formed on the surface of the photosensitive drum 1 is developed with toner as a developer by the development unit 4. Details of the development unit 4 will be described below.

On the other hand, at a predetermined control timing, a pickup roller 8 is driven as a conveying means, recording materials P such as recording paper sheets stacked and accommodated in a recording material tray 7 serving as a recording material accommodating portion are separated one by one for feeding. As a result, each of the recording materials P is conveyed to a transfer portion N at a predetermined control timing. Further, the transfer roller 5 is in contact with the surface of the photosensitive drum 1 with a predetermined pressing force to form the transfer portion (a transfer nip) N. The recording material P is conveyed to the transfer portion N via a transfer guide 9 as a guide member. While the recording material P is sandwiched and conveyed between the photosensitive drum 1 and the transfer roller 5 and passes through the transfer portion N, a toner image on the surface of the photosensitive drum 1 is electrostatically transferred to the surface of the recording material P. At this time, a transfer voltage that is a DC voltage having a polarity opposite to a charging polarity of the toner during development (a negative polarity in Example 1) is applied to the transfer roller 5 from a transfer power supply (a high voltage power supply) (not shown) provided in the apparatus main body 110.

The recording material P to which the toner image has been transferred is separated from the photosensitive drum 1 and conveyed to a fixing device 10 serving as a fixing means provided downstream of the transfer portion N in a conveying direction of the recording material P. The recording material P is heated and pressurized by the fixing device 10 to undergo a toner image fixing process. In Example 1, the fixing device 10 has a heating roller having a halogen heater therein and a pressure roller pressed against the heating roller. The fixing device 10 heats and presses the toner image transferred to the surface of the recording material P while the recording material P is sandwiched and conveyed in a fixing nip between the heating roller and the pressure roller. As a result, the toner image is fused and fixed on the surface of the recording material P. After that, the recording material P is discharged to a discharge tray 11 provided on the upper part of the apparatus main body 110.

After the recording material P has been separated from the surface of the photosensitive drum 1, the surface of the photosensitive drum 1 is cleaned by the cleaning device 6 and repeatedly subjected to an image forming process starting from the charging described above. The cleaning device 6 removes an adhesive material such as residual transfer toner from the surface of the rotating photosensitive drum 1 with a cleaning blade 61 as a cleaning member disposed in contact with the photosensitive drum 1 and collects the removed adhesive material in a collected toner container 62.

Process Cartridge

Figure 2:
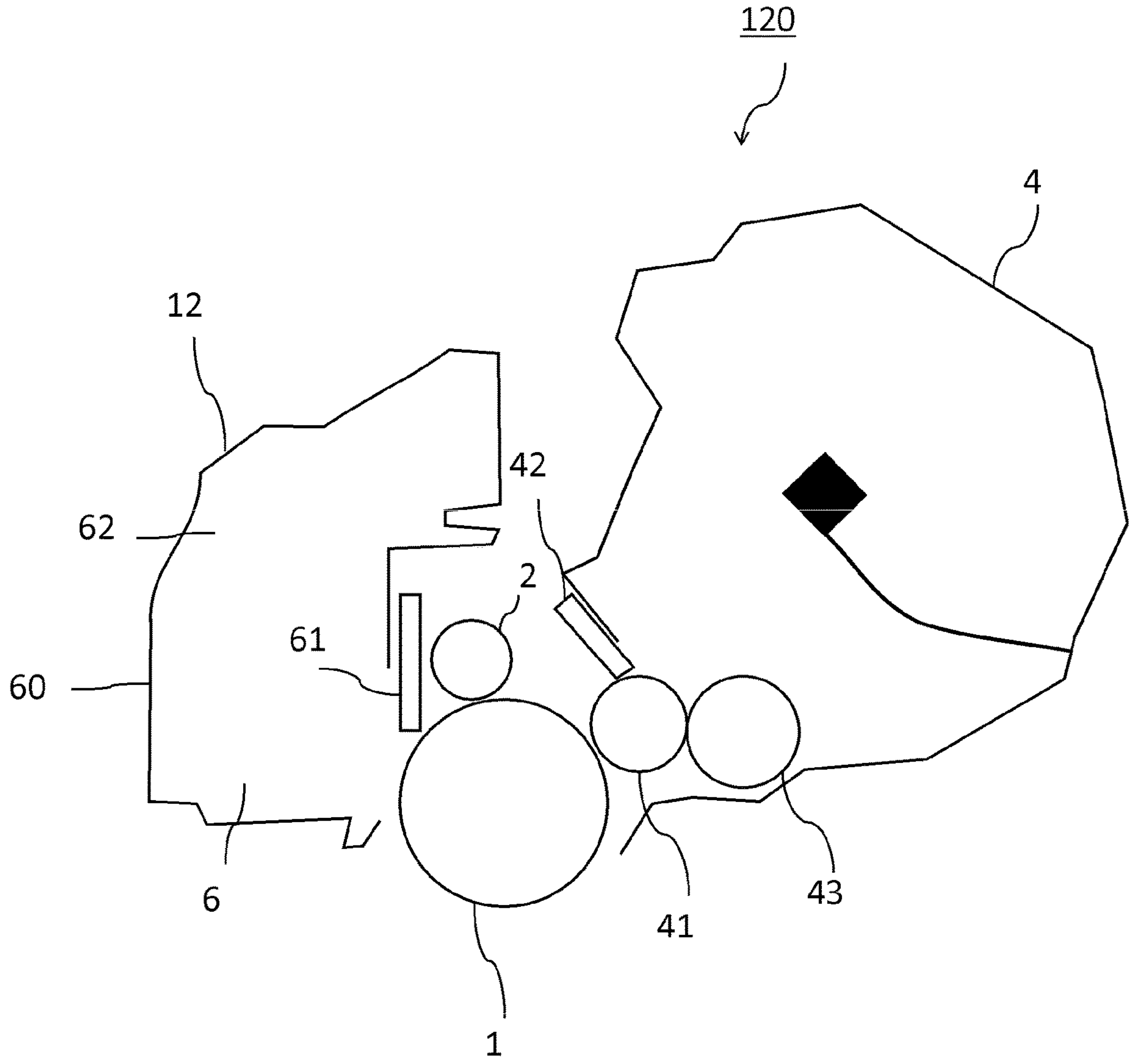
FIG. 2 is a schematic cross-sectional view of a process cartridge in the embodiment.

FIG. 2 is a schematic cross-sectional view of the process cartridge 120. In Example 1, the photosensitive drum 1 and the charging roller 2, the development unit 4, and the cleaning device 6 as process means acting on the photosensitive drum 1 are integrally formed into a cartridge, and the process cartridge 120 is configured to be attachable to and detachable from the apparatus main body 110.

The process cartridge 120 is configured by connecting a cleaning unit 12 and the development unit (a development device) 4 which is separate from the cleaning unit 12 to each other.

The cleaning unit 12 includes the photosensitive drum 1, the charging roller 2, and the cleaning device 6. The cleaning unit 12 also includes a cleaning frame 60 that forms the collected toner container 62 and supports the photosensitive drum 1, the charging roller 2, and the cleaning blade 61. Details of the development unit 4 will be described below.

Generally, a process cartridge is one in which an image bearing member such as a photosensitive member and a process means acting on an image bearing member are integrally formed into a cartridge to be attachable to and detachable from an apparatus main body of an image forming apparatus. Examples of the process means include a charging means, a development means, a cleaning means, a toner charging means for charging transfer residual toner, and the like. Here, a process cartridge is one in which at least a developer container or a development device and an image bearing member are integrally formed into a cartridge to be attachable to and detachable from an apparatus main body of an image forming apparatus.

Figure 3:
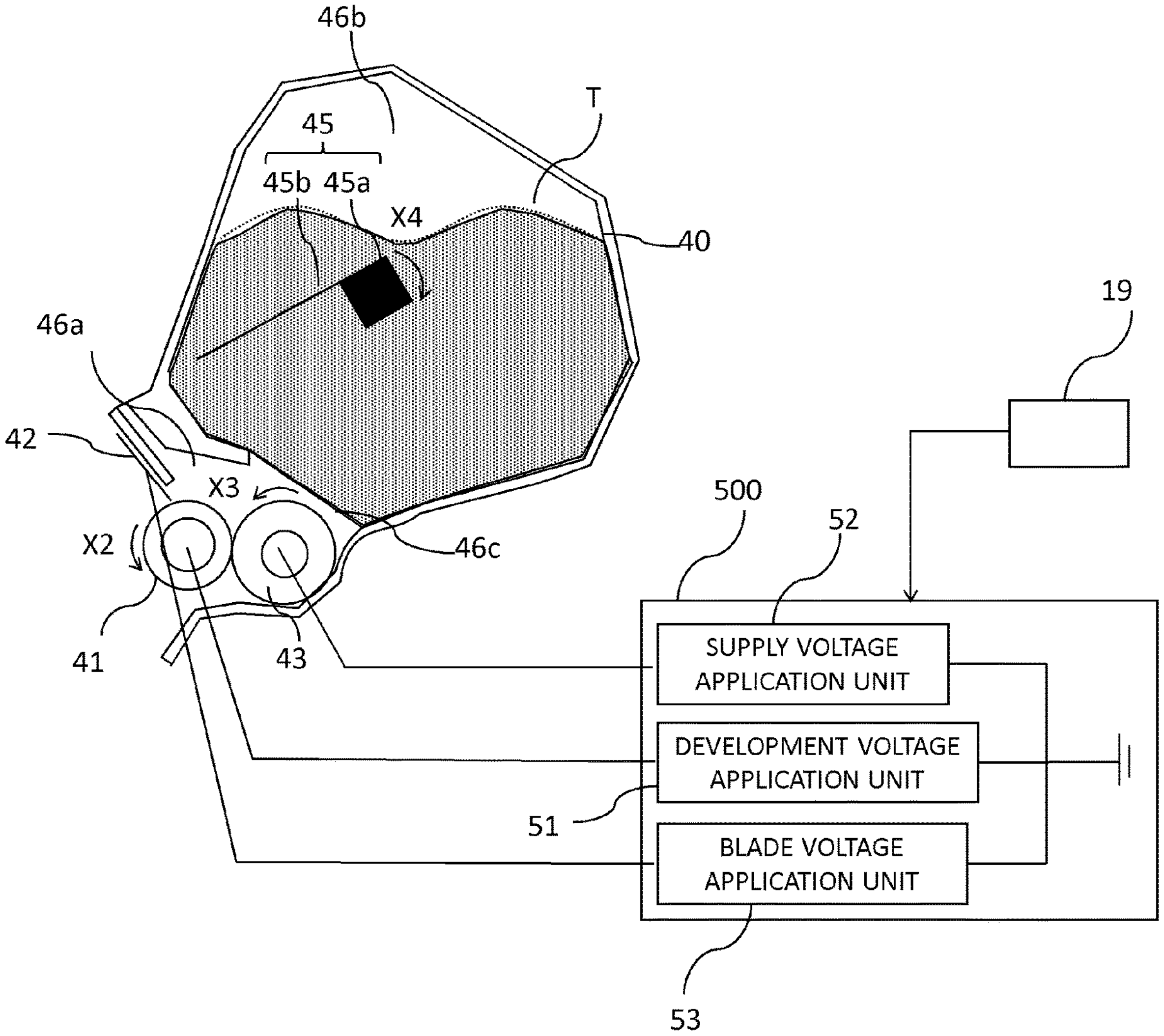
FIG. 3 is a schematic cross-sectional view of a development device in the embodiment.

FIG. 3 is a schematic cross-sectional view of the development unit 4 in Example 1. The development unit 4 of Example 1 includes a development chamber 46*a*, a developer container 46*b* accommodating a one-component developer (toner T) as a developer, and a development frame 40 for supporting each element described below. Further, the developer container 46*b* includes an agitating member 45 constituted by an agitating shaft 45*a* and an agitating sheet 45*b*, and the agitating shaft 45*a* rotates in a direction of an arrow X4 to transport the toner T to the development chamber 46*a*.

A development roller 41, which is a cylindrical member as a developer carrying member, is disposed in the development chamber 46*a*. A part of the development roller 41 is disposed to be able to be in contact with the photosensitive drum 1 through an opening 46*c* formed on a side of the photosensitive drum 1. The development roller 41 is rotatably supported by the development frame 40 at both end portions in a longitudinal direction (a rotation axis direction) thereof. The development roller 41 is disposed to be in contact with the photosensitive drum 1. The development roller 41 is rotationally driven in a direction of an arrow X2 in the figure by receiving a rotational driving force from a driving motor (not shown) provided in the apparatus main body 110. A development voltage necessary for developing the electrostatic latent image as a toner image is applied to the development roller 41 from a development voltage application unit 51.

A supply roller 43, which is a supply member for supplying toner to the photosensitive drum 1, is disposed on the periphery of the development roller 41 and rotates in an X3 direction in contact with the development roller 41. A supply voltage is applied to the supply roller 43 from a supply voltage application unit 52. Since the supply voltage application unit 52 applies a voltage obtained by dividing the charging voltage from the high voltage power supply through a bipolar transistor, high speed switching of the supply voltage is possible.

In Example 1, the development unit 4 in which the surfaces of the development roller 41 and the supply roller 43 move in opposite directions at a contact portion therebetween has been exemplified, but the present invention is also applicable to a development device in which the surfaces of the development roller and the supply roller move in the same direction at the contact portion.

Further, in the development chamber 46*a*, a development blade 42, which is made of an elastic member and is a regulation member that regulates the layer thickness of the toner carried on the development roller 41, is disposed to be in contact with the outer peripheral surface of the development roller 41. The development blade 42 is supported by the development frame 40. A blade voltage (a regulation voltage) is applied to the development blade 42 from a blade voltage application unit 53.

The development voltage application unit 51, the supply voltage application unit 52, and the blade voltage application unit 53 constitute a power supply unit 500, and application of the development voltage, the supply voltage, and the regulation voltage performed by the power supply unit 500 is controlled by the control unit 19. Bias control performed by the control unit 19 will be described below.

Next, the development roller 41, the supply roller 43, and the development blade 42 will be explained. The development roller 41 has a conductive metal core, a base layer of silicone rubber, and a surface layer of urethane rubber. There are roughening particles on the surface layer to optimize the amount of toner loaded. The supply roller 43 is a conductive sponge roller in which a foaming layer is formed on a conductive core metal. The development blade 42 is made of a SUS sheet metal, and a long side portion thereof, which is in contact with the development roller 41 and becomes a free end, is laminated and coated with a resin.

The development roller 41 and the photosensitive drum 1 rotate such that their surfaces move in the same direction at opposing portions (contact portions). In Example 1, the development roller 41 is disposed in contact with the photosensitive drum 1, but the development roller 41 may be disposed close to the photosensitive drum 1 with a predetermined gap therebetween.

The photosensitive drum 1 is electrically grounded, and an electric field corresponding to a potential difference between the development voltage and the surface potential of the photosensitive drum 1 is generated in a region between the photosensitive drum 1 and the development roller 41 to which the development voltage is applied. The toner T charged with the regular polarity and conveyed to a development region is subjected to an electrostatic force due to this electric field and is transferred to the surface of the photosensitive drum 1 according to the electrostatic latent image on the surface of the photosensitive drum 1. As a result, the electrostatic latent image on the photosensitive drum 1 is developed with the toner T. In Example 1, the electrostatic latent image is developed by adhering the toner T charged with the same polarity as the charging polarity of the photosensitive drum 1 (a negative polarity) to an exposed portion (an image portion) on the photosensitive drum 1 where an absolute value of the potential is attenuated by being exposed after being uniformly charged (a reversal development method).

In Example 1, an image forming apparatus using toner with a negative regular polarity has been described as an example, but the present invention is also applicable to an image forming apparatus using toner with a positive regular polarity.

Movement of Toner in Development Device

The toner T is conveyed to the opening 46*c* serving as a toner supply port by the agitating member 45. The toner T conveyed from the opening 46*c* to the development chamber 46*a* is supplied to the development roller 41 by the supply roller 43. The supply roller 43 and the development roller 41 are in contact with each other to form a nip portion. In Example 1, the supply roller 43 and the development roller 41 rotate in opposite directions at the nip portion. The supply roller 43 and the development roller 41 may be configured to rotate in the same direction in the nip portion. An electrostatic force corresponding to a potential relationship between the development voltage and the supply voltage and a charging polarity of the toner acts on the toner held on the outer peripheral portion of the supply roller 43. In Example 1, the regular charging polarity of the toner is negative, and the development voltage and the supply voltage are negative potentials. In a case where the development voltage is higher in potential than the supply voltage (the absolute value of the development voltage is smaller than the absolute value of the supply voltage), an electrostatic force acts on the toner charged with a negative regular polarity in a direction from the supply roller 43 toward the development roller 41. As a result, the toner held by the supply roller 43 is supplied onto the development roller 41. Controlling the development voltage and the supply voltage such that an electrostatic force acts on the toner from the supply roller 43 toward the development roller 41 is referred to as supply voltage control. In a case where the regular polarity of the toner is negative, the development voltage and the supply voltage are negative potentials, and in the supply voltage control, the application of the voltage is controlled such that the absolute value of the supply voltage is greater than the absolute value of the development voltage. That is, the supply voltage is controlled to a lower potential (a negative potential with a larger absolute value) than the development voltage (for example, the development voltage −400 V, the supply voltage −500 V).

After that, the toner with which the surface of the development roller 41 is coated is frictionally charged through rubbing at a contact portion between the surface of the development roller 41 and the tip end portion of the development blade 42 and is regulated to a predetermined layer thickness. As a result, the amount of the toner carried on the surface of the development roller 41 is adjusted to a constant amount. The toner whose layer thickness is regulated by the development blade 42 is transferred from the surface of the development roller 41 to the image portion of the photosensitive drum 1 to develop the electrostatic latent image, but the toner not used for development (the residual development toner) reaches the contact portion with the supply roller 43 as the development roller 41 rotates. The residual development toner is scraped off from the development roller 41 according to the mechanical rubbing between the development roller 41 and the supply roller 43, the charging characteristics of the residual development toner, the potential difference between the development roller 41 and the supply roller 43, and the like. Alternatively, the residual development toner is mixed with the toner in the development chamber 46*a* or the supply roller 43 on the surface of the development roller 41.

Charging Characteristics of Toner on Development Roller

Toner coating on the surface of the development roller 41 in a region on a downstream side of a contact position with the supply roller 43 and an upstream side of a contact position with the development blade 42 in a rotational direction of the development roller 41 is referred to as pre-coating. That is, the toner is supplied from the supply roller 43 and is on the development roller 41 until it is regulated by the development blade 42. The amount of pre-coating and the charging characteristics change depending on the potential relationship between the supply voltage and the development voltage. Furthermore, the charging characteristics of the toner on the development blade 42 after passing through the development blade 42 is determined with the blade voltage generated when the pre-coated toner passes through the development blade 42.

Low Density Due to Residual Development Toner Adhered to Surface of Development Roller Next, low density caused by the residual development toner adhered to the surface of the development roller 41 will be described. As described above, the residual development toner is usually less likely to remain on the development roller 41 because it is mixed with the toner in the development chamber 46*a* on the surface of the development roller 41 or is scraped off from the surface of the development roller 41 by the supply roller 43. Here, in a state where the supply voltage control is performed (for example, in a state where the development voltage is −400 V and the supply voltage is −500 V), an electrostatic force acts on the toner charged with a negative polarity in a direction from the supply roller 43 toward the development roller 41. Due to this electrostatic force, in a case where the minute toner on the surface of the development roller 41 holds a high negative charge, in a state where the supply voltage control is performed, the minute toner tends to maintain a state of being adhered to a side of the development roller 41. If this state continues, a lower layer portion of the toner coating on the surface of the development roller 41 is covered with the charged-up minute toner, and an upper layer portion thereof is less likely to be directly influenced by the voltage from the development roller 41 and is less likely to have a charge. Therefore, the negatively charged toner supplied from the supply roller 43 is less likely to have a charge when it reaches the development roller 41, and the negatively charged toner is sparsely present in the upper layer portion. After that, when the toner on the development roller 41 is transferred toward the latent image on the photosensitive drum 1, the lower layer portion is less likely to be used for development because the lower layer portion is in a state where the minute toner is strongly adhered and remains on the development roller 41 as the residual development toner. On the other hand, the toner in the upper layer is mainly used for development. For this reason, especially in an all-black image or the like, the amount of toner used for development may be insufficient with respect to the amount of toner required for image formation, resulting in the low density. As described above, in the development device, the minute toner that is likely to have a charge among the residual development toner continues to be adhered to the lower layer portion of the surface of the development roller 41, resulting in an image defect with the low density.

Stripping Bias Control

As a countermeasure against this, by controlling the application of a voltage such that an electrostatic force acts on the toner in a direction from the development roller 41 toward the supply roller 43, it is possible to strip off the minute toner from the development roller 41 and thus to prevent the minute toner from continuing to remain on the development roller 41. Controlling the development voltage and the supply voltage such that an electrostatic force acts on the toner charged with the regular polarity from the development roller 41 toward the supply roller 43 is referred to as stripping voltage control. In a case where the regular polarity of the toner is negative, the development voltage and the supply voltage are negative potentials, and in the stripping voltage control, the application of the voltage is controlled such that the absolute value of the supply voltage is smaller than the absolute value of the development voltage. That is, the supply voltage is controlled to a higher potential (a negative potential with a smaller absolute value) than the development voltage (for example, the development voltage −400 V, the supply voltage −300 V).

In a state where the minute toner is adhered to the surface of the development roller 41, there are many negative charges on the surface of the development roller 41, and thus the surface potential of the development roller 41 becomes a low potential that is lower than that of the applied development voltage (becomes a negative potential having a large absolute value). For example, in a case where the development voltage is −400 V, the surface potential of the development roller 41 with a large amount of the minute toner adhered to the surface is −450 V. For the stripping voltage control, it is sufficient that the supply voltage has a higher potential than the surface potential of the development roller 41, and thus, for example, the application of the voltage may be controlled such that the absolute value of the supply voltage is equal to the absolute value of the development voltage. That is, the supply voltage and the development voltage may be set to the same potential (for example, the supply voltage −400 V, the development voltage −400 V).

Furthermore, if the stripping voltage control is performed from the previous rotation to the time of paper passing, there is a possibility that the amount of regularly charged toner necessary for image formation will not be supplied to the development roller 41. For this reason, the period in which the stripping voltage control is performed may be a period corresponding to about one rotation of the development roller 41 in a sheet interval. Here, the sheet interval is a period from the end timing of image formation on a recording material to the start timing of image formation on the next recording material in a case where images are formed continuously on a plurality of recording materials P.

Development Streak

Next, a mechanism of a development streak will be described. When the external additive of the toner is removed and deteriorates, toner charged with a polarity opposite to the regular charging polarity is likely to be generated. When the amount of toner in the pre-coating is small, the toner charged with the opposite polarity enters the contact portion between the development roller 41 and the development blade 42, and the toner charged with the opposite polarity is fused at the tip end portion of the free end of the development blade 42. When fusion occurs, a fused portion scrapes off the toner coating on the development roller 41, which appears as a streak on the image. This phenomenon is called a development streak. On the other hand, in a case where the pre-coating is sufficiently secured, the toner charged with the opposite polarity is prevented from entering the blade contact portion, and the development streak is less likely to occur.

In this way, the occurrence of the development streak depends on the amount of the pre-coating. The pre-coating is better formed as the electrostatic force acting on the toner in a direction from the supply roller 43 toward the development roller 41 is stronger. In the state of the supply voltage control, a large amount of the toner is discharged from the supply roller 43 and the amount of the pre-coating increases, and thus the development streak can be suppressed. Conversely, in the state of the stripping voltage control, the electrostatic force acts on the toner in the direction from the development roller 41 toward the supply roller 43, and the amount of the pre-coating decreases, and thus the development streak is likely to occur.

As described above, performing the stripping voltage control is effective as a countermeasure against the low density caused by contamination of the surface of the development roller 41 with the minute toner, but when the stripping voltage control is performed, the development streak is likely to occur.

Stripping Bias Control of Example 1

Therefore, in Example 1, the voltage control to make the blade voltage generated when the stripping voltage control is performed to a lower potential than the blade voltage generated when the supply voltage control is performed (to increase the absolute value of the negative blade voltage) is performed. Here, the polarity of the blade voltage is the regular polarity of the toner. As a result, it is possible to forcibly charge the toner that has entered the contact portion between the development blade 42 and the development roller 41 and has been charged with the opposite polarity (in the case of Example 1, the toner charged with the positive polarity; also referred to as positive toner) with the regular polarity (in the case of Example 1, the negative polarity). For this reason, by performing the stripping voltage control, it is possible to suppress the low density caused by the minute toner particles being adhered to the development roller 41, and it is possible to suppress the development streak caused by the toner that has entered the blade contact portion being caught and fused by the blade tip end portion.

When a state where the absolute value of the blade voltage is large during image formation is maintained, it will lead to charging-up of the entire toner and fusion of strongly positively charged external additives and the like, and the development streak may be likely to occur as an adverse effect. For this reason, it is desirable to increase the absolute value of the blade voltage especially in a case where the stripping voltage control is performed.

Charging Distribution of Toner After Passing Through Development Blade

Figure 4A:
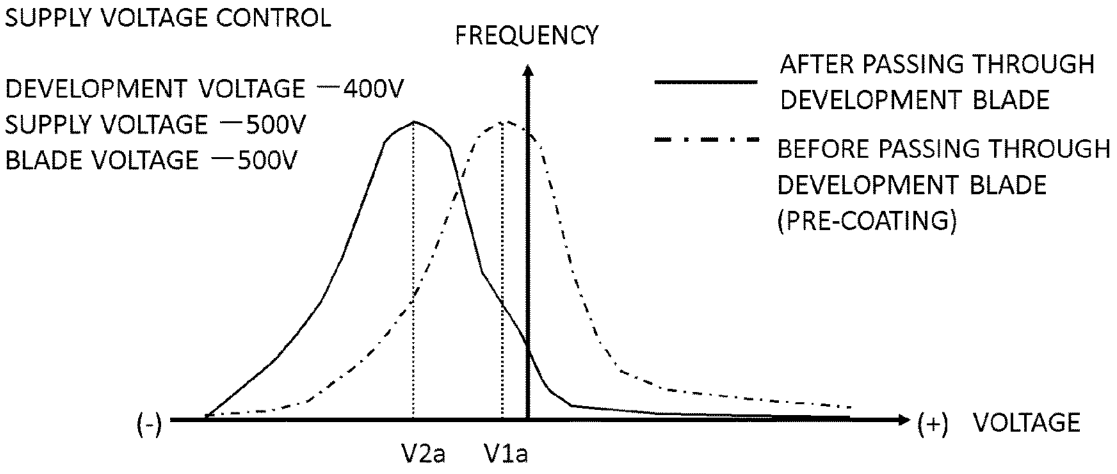
FIGS. 4A to 4C are diagrams each showing charging distribution of toner that changes with each voltage.
Figure 4B:
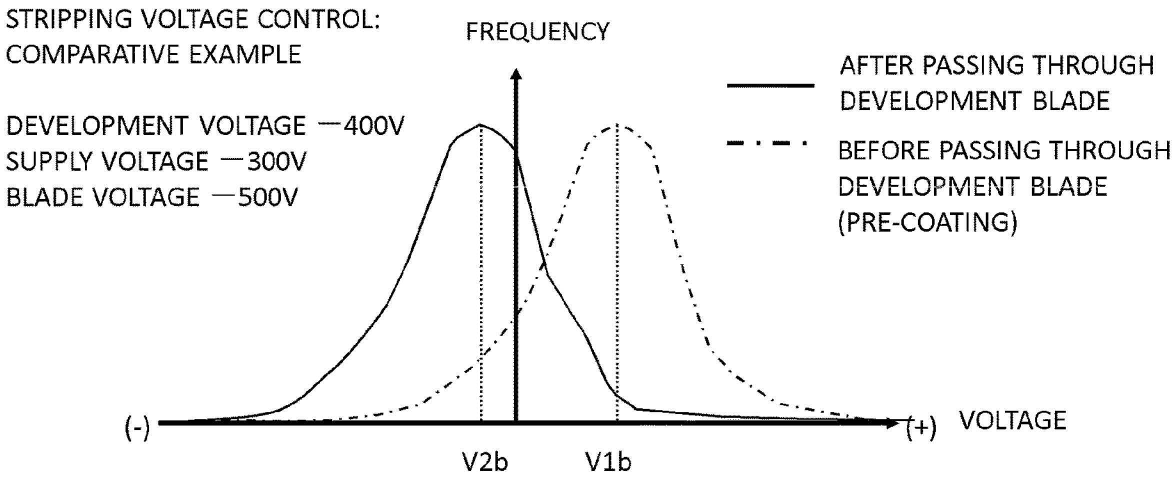
Figure 4C:
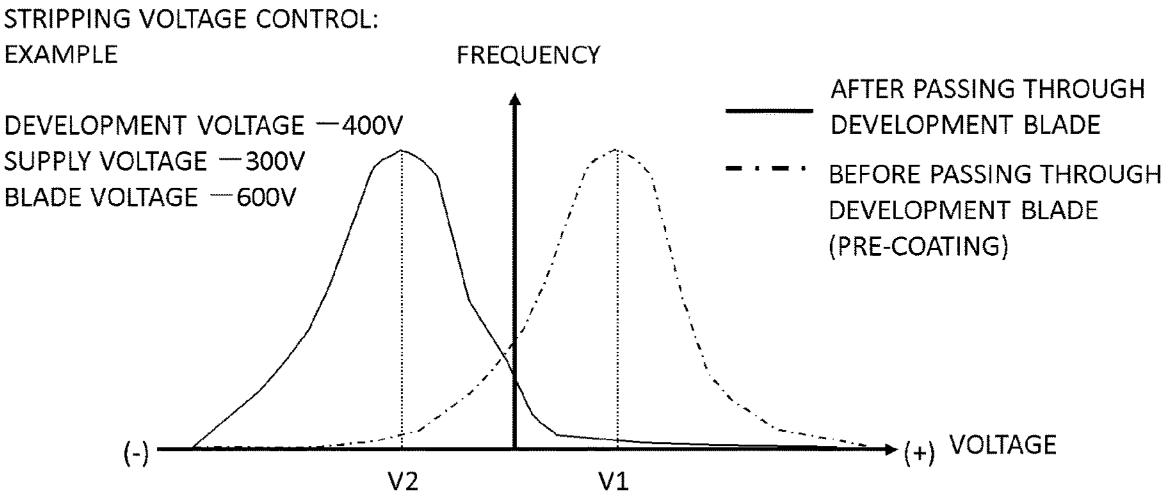

The details and effects of the control will be explained below. FIGS. 4A to 4C show the charging distribution of the toner before and after passing through the development blade 42. FIG. 4A shows a case where the supply voltage control is executed, FIG. 4B shows a case where stripping voltage control of a comparative example which will be described below is executed, and FIG. 4C shows a case where the stripping voltage control of Example 1 described above is executed. A solid line in the figure indicates the charging distribution after passing through the development blade 42, and a dashed line indicates the charging distribution of the pre-coating before passing through the development blade 42.

The development voltage is −400 V in all of FIGS. 4A to 4C. In the supply voltage control shown in FIG. 4A, the supply voltage is −500 V and the blade voltage is −500 V. In the stripping voltage control of the comparative example shown in FIG. 4B, the supply voltage is −300 V and the blade voltage is −500 V. In the stripping voltage control of Example 1 shown in FIG. 4C, the supply voltage is −300 V and the blade voltage is −600 V. The value of each voltage is an example and is not limited to this.

When the supply voltage control shown in FIG. 4A is executed, an electrostatic force acts on the negative toner charged with the regular polarity in a direction from the supply roller 43 toward the development roller 41, and the toner is discharged from the supply roller 43. As a result, the amount of the toner in the pre-coating increases, and a median value $V1a$ of the charging distribution of the toner in the pre-coating before passing through the development blade 42 shifts toward the negative side. When the toner on the pre-coating enters the contact portion between the development blade 42 and the development roller 41, the toner is charged through frictional charging and charge injection from the development blade 42. At this time, since the blade voltage is on the negative side with respect to the development voltage, the toner regulated by the development blade 42 stays on the development roller 41 while being charged with a mainly negative charge. As a result, a median value V2*a* of the charging distribution of the toner on the development roller 41 after passing through the development blade 42 becomes more negative than the median value Via of the charging distribution of the toner in the pre-coating. The period in which the supply voltage control shown in FIG. 4A is executed is referred to as a first period.

When the stripping voltage control of the comparative example shown in FIG. 4B is executed, an electrostatic force acts on the negative toner charged with the regular polarity in a direction from the development roller 41 toward the supply roller 43, and thus toner is not supplied from the supply roller 43 to the development roller 41. For this reason, the amount of the toner in the pre-coating decreases compared to that generated when the supply voltage control shown in FIG. 4A is executed, and a median value V1*b* of the charging distribution shifts toward the positive side. The blade voltage is on the negative side with respect to the development voltage, and negative charge injection is performed by the development blade 42. However, the amount of negative toner in the pre-coating decreases, and the charging distribution shifts toward the positive side. For this reason, although a median value V2*b* of the charging distribution after passing through the development blade 42 becomes more negative than the median value V1*b* of the charging distribution of the toner in the pre-coating, there is still a large amount of toner charged on the positive side.

When the stripping voltage control of Example 1 shown in FIG. 4C is executed, an electrostatic force acts on the negative toner charged with the regular polarity in a direction from the development roller 41 toward the supply roller 43, and thus toner is less likely to be supplied from the supply roller 43 to the development roller 41. For this reason, the amount of the toner in the pre-coating decreases compared to that generated when the supply voltage control shown in FIG. 4A is executed, and a median value V1 of the charging distribution shifts toward the positive side. The charging distribution of the pre-coating is similar to that shown in FIG. 4B. In the stripping voltage control of Example 1, the absolute value of the blade voltage is larger than the absolute value of the blade voltage in the first period (the blade voltage in the supply voltage control in FIG. 4A). Therefore, a potential difference between the development voltage and the blade voltage in the stripping voltage control of Example 1 is (−600 V)−(−400 V)=−200 V and is greater than a potential difference in the comparative example shown in FIG. 4B, that is, (−500 V)− (−400 V)=−100 V. For this reason, the amount of the charge injected from the development blade 42 to the toner increases, and a median value V2 of the charging distribution of the toner after passing through the development blade 42 becomes more negative than the median value V2*b* in the comparative example, and the toner charged on the positive side is smaller than that of the comparative example. The period in which the stripping voltage control shown in FIG. 4C is executed is referred to as a second period.

As described above, according to Example 1, even if the amount of the pre-coating is reduced through the stripping voltage control, the potential difference between the development voltage and the blade voltage is large, and thus the toner of the opposite polarity present on the development roller 41 is forcibly charged with a negative polarity as it passes through the development blade 42. For this reason, it is possible to prevent the positive toner from being fused to the tip end portion of the development blade 42, and it is possible to suppress the occurrence of the development streak.

Supply Bias Control and Blade Bias Control

Figure 5:
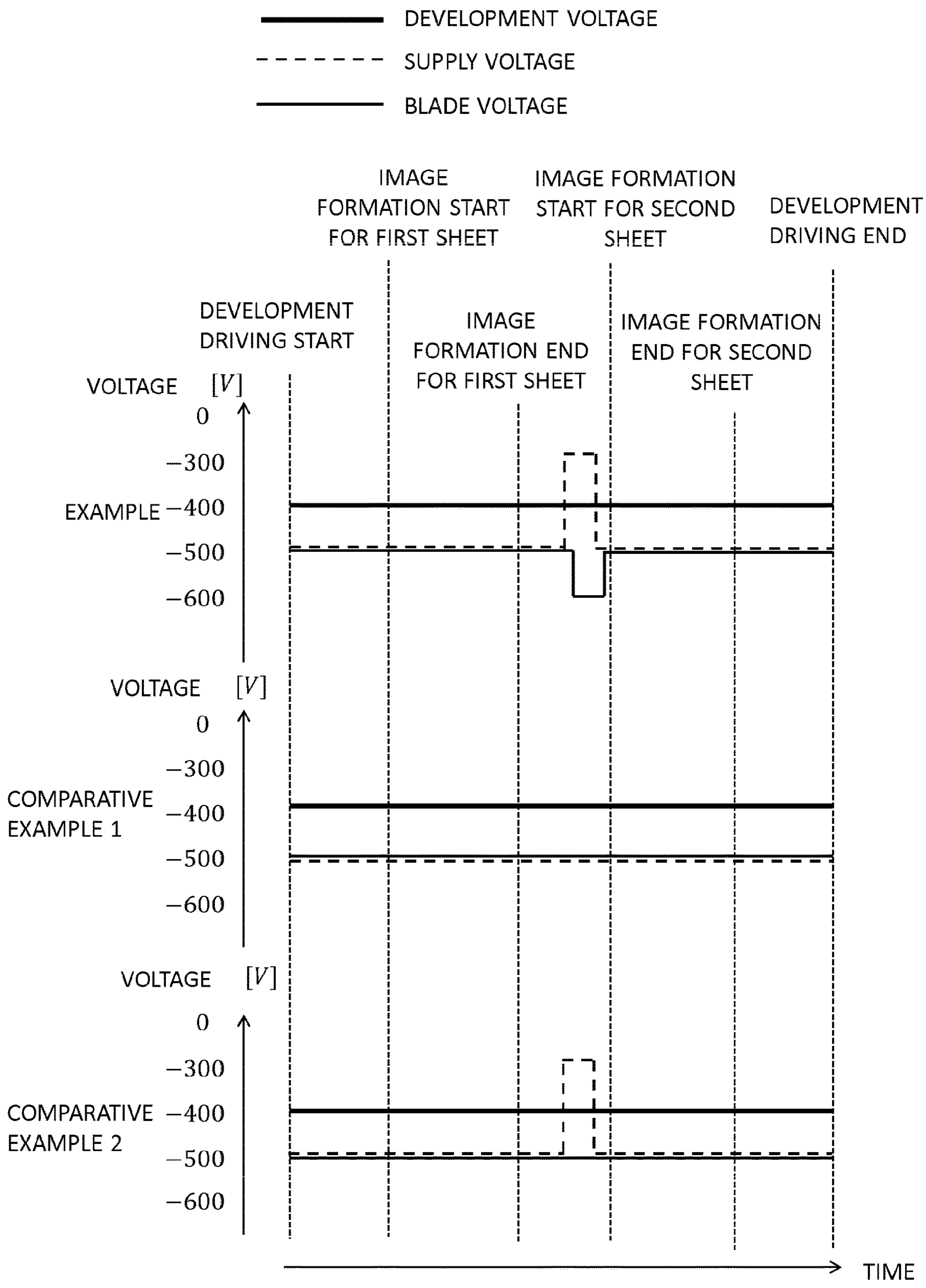
FIG. 5 is a timing chart of voltage control in the embodiment.

The voltage control related to the development roller 41, the supply roller 43, and the development blade 42 in Example 1 will be explained with reference to FIG. 5. FIG. 5 is a timing chart showing the voltage control in a case where two sheets are printed in succession in Example 1, Comparative Example 1, and Comparative Example 2.

The timing and operation in this timing chart will be explained. In the figure and the following description, “development driving start” indicates the timing at which the development roller 41 and the supply roller 43 start rotating by receiving a driving force from the driving means provided in the apparatus main body 110. “Image formation start” indicates the timing of image writing at which the laser light is swept in a sub-scanning direction. “Image formation end” indicates the timing at which laser exposure in which the laser light is swept in the sub-scanning direction ends. “Development driving end” indicates the timing at which the driving force received from the driving means stops.

In Example 1, the development voltage applied to the development roller 41 is constant −400 V from the development driving start to the development driving end. That is, the development voltage in the first period and the development voltage in the second period are equal to each other. This control of the development voltage is just an example, and control in which the development voltage changes may also be possible.

From the development driving start to the image formation start for a first sheet, and during an image formation operation for the first sheet (from the image formation start to the image formation end), the control unit 19 performs the supply voltage control shown in FIG. 4A. That is, voltage application is controlled such that an electrostatic force acts on the toner in a direction from the supply roller 43 toward the development roller 41. In Example 1, the voltage application is controlled such that the absolute value of the supply voltage is greater than the absolute value of the development voltage. Therefore, a period from the development driving start to the image formation start for the first sheet and a period during the image formation operation for the first sheet (a period from the image formation start to the image formation end) are included in the first period.

In a period corresponding to one rotation of the development roller 41 of a period from the image formation end for the first sheet to the image formation start for the second sheet (the sheet interval), the control unit 19 performs the stripping voltage control shown in FIG. 4C. That is, the voltage application is controlled such that an electrostatic force acts on the toner in a direction from the development roller 41 toward the supply roller 43 and the absolute value of the blade voltage is greater than the absolute value of the blade voltage in the supply voltage control in the first period. In Example 1, the voltage application is controlled such that the absolute value of the supply voltage is smaller than the absolute value of the development voltage. Therefore, at least a part of the period of the sheet interval (in Example 1, the period of one rotation of the development roller 41 (the period in which the development roller 41 rotates once)) is included in the second period. The supply voltage control shown in FIG. 4A is performed in the period of the sheet interval other than the period in which the stripping voltage control is executed. Therefore, the period of the sheet interval other than the period in which the stripping voltage control is executed (the period of the paper interval that is not included in the second period) is included in the first period. Here, the change timing of the blade voltage in the stripping voltage control may be simultaneous with the change timing of the supply voltage, or the change timing of the blade voltage may be delayed with respect to the change timing of the supply voltage. In a case of being delayed, the delay time can be set on the basis of the time it takes for the contact portion of the development roller 41 with the supply roller 43 to reach the contact portion with the development blade 42. The delay time depends on the dimensions, the rotational speed setting, and the like of the development roller 41 and is, for example, several milliseconds. In a case where the change timing of the blade voltage is delayed with respect to the change timing of the supply voltage, the start timing of the second period may be the change timing of the supply voltage, or may be the change timing of the blade voltage. The end timing of the second period may be the timing at which the supply voltage is returned to a control value for the supply voltage control, or may be the timing at which the blade voltage is returned to a control value for the supply voltage control.

The stripping voltage control may be performed in the entire period of the sheet interval. In other words, the entire period of the sheet interval may be included in the second period. However, depending on the period in which the stripping voltage control is performed, the amount of the toner stripped may become too large, the toner in the pre-coating that should be charged with a negative polarity by the blade voltage may be insufficient, and the development streak may be more likely to occur. It is desirable to set a suitable period for performing the stripping voltage control as appropriate depending on the environment, toner characteristics, and the like.

Comparative Example 1 is an example in which the supply voltage control of FIG. 4A is executed even in the sheet interval. That is, in Comparative Example 1, the entire period from the development driving start to the development driving end is included in the first period. Comparative Example 2 is an example in which the stripping voltage control shown in FIG. 4B is executed in a part of the sheet interval. In other words, the voltage control for increasing the absolute value of the blade voltage is not performed when the stripping voltage control is performed in the sheet interval.

Evaluation Experiment

The contents of an experiment conducted to confirm the effects of Example 1 will be explained. In this experiment, in an environment with a temperature of 32.5° C. and a humidity of 80%, 3-dot and 297-space horizontal lines were printed on a letter-size paper sheet by 10,000 sheets, and then an all-black image and a halftone image were printed, and evaluation of the density of the all-black image and the development streak was performed. The halftone image of Example 1 is an image pattern with a density of 0.6 in X-rite.

For the evaluation the low density of the all-black image, the density at the center of the output leading edge and trailing edge of the image was measured using X-Rite. The results were ranked from A to C as shown below to be used as evaluation criteria. If the density is at least 1.2 in X-rite, it is determined that there is no problem as an image.

A: Center density of all-black image at least 1.3

B: Center density of all-black image at least 1.2 and less than 1.3

C: Center density of all-black image less than 1.2

For the evaluation of the development streak, the number of streaks appearing on the halftone image from the leading edge to the trailing edge of the image was visually counted, and the results were ranked from A to C as shown below to be used as evaluation criteria. If a vertical streak does not occur on the halftone image, it is determined that there is no problem as an image.

A: Vertical streaks on halftone image 0

B: Vertical streaks on halftone image 1 to 3

C: Vertical streaks on halftone image at least 3

An evaluation experiment was conducted by applying the voltage control of Example 1, Comparative Example 1, and Comparative Example 2 in the case where continuous image formation of two sheets shown in FIG. 5 was performed to the printing of the all-black image and the halftone image of continuous two sheets. The evaluation results are shown in Table 1.

TABLE 1

Evaluation of output images of example and comparative example

| | Low density of all black image | Development streak |
|---|---|---|
| Example | A | A |
| Comparative Example 1 | C | A |
| Comparative Example 2 | A | C |

In a case where the voltage control of Comparative Example 1 was performed, the low density occurred at the time of printing of the all-black image. It is considered that this is because printing was repeated while the minute toner that had been charged up to the negative side remained adhered to the development roller 41 due to not executing the stripping voltage control, and the lower layer of the toner coating on the surface of the development roller 41 was gradually covered by the minute toner. As a result, even though the amount of toner coating loaded to the development roller 41 was appropriate, the toner on the lower layer remained adhered and was not developed, and the toner on the upper layer only had sparse charges, which is considered to be the cause of the low density.

Further, in a case where the voltage control of Comparative Example 2 was performed, although the occurrence of the low density was suppressed, the development streak occurred. It is considered that this is because the minute toner on the development roller 41 was stripped from the development roller 41 by executing the stripping voltage control in the sheet interval, and the coating by the minute toner was suppressed. On the other hand, it is considered that since control to increase the absolute value of the blade voltage was not performed in the stripping voltage control, it was not possible to forcibly charge the toner that had been charged on the positive side due to deterioration or the toner that had aggregated and became foreign matter with a negative polarity, and the toner was fused to the development blade 42.

Although the above experiment was conducted in high-temperature and high-humidity environment with a temperature of 32.5° C. and humidity of 80%, the charging distribution of the toner and the charge-up property of the minute toner change in a case where the usage environment of the image forming apparatus 100 changes. Even under usage environmental conditions with different temperatures and humidity, by appropriately adjusting the voltage settings and then executing the stripping voltage control of Example 1, it was possible to similarly achieve both suppression of the low density of the all-black image and suppression of the development streak.

According to Example 1, it is possible to achieve both suppression of the low density and suppression of the development streak even in a state where the toner charged with the opposite polarity or the aggregates exist in the development chamber due to deterioration or the like. As a result, it is possible to provide an image forming apparatus having a long life and a high image quality.

In Example 1, a configuration in which the regular charging polarity of the toner is negative and the applied voltages are also negative has been mentioned, but the present invention is applicable even if the regular charging polarity of the toner is positive and the applied voltage is positive.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-178719, filed on Nov. 8, 2022, which is hereby incorporated by reference herein in its entirety.

What is claimed is:

1. An image forming apparatus that forms an image on a recording material using a developer charged with a regular polarity, comprising:

an image bearing member on which an electrostatic latent image is formed;

a developer carrying member that develops the electrostatic latent image formed on the image bearing member with the developer;

a supply member that supplies the developer to the developer carrying member;

a regulation member that regulates a layer thickness of the developer carried on the developer carrying member;

an application unit that applies a voltage to each of the developer carrying member, the supply member, and the regulation member; and a control unit that controls application of the voltage performed by the application unit, wherein the control unit controls, in a first period, application of the voltage such that an electrostatic force acts on the developer charged with the regular polarity in a direction from the supply member toward the developer carrying member, and controls, in a second period, application of the voltage such that an electrostatic force acts on the developer charged with the regular polarity in a direction from the developer carrying member toward the supply member, a polarity of a regulation voltage applied to the regulation member is equal to the regular polarity, an absolute value of the regulation voltage is greater than an absolute value of a regulation voltage applied to the regulation member in the first period, and a difference between a development voltage applied to the developer carrying member and the regulation voltage is greater than a difference between the development voltage and a supply voltage applied to the supply member.

2. The image forming apparatus according to claim 1, wherein, in the first period, an absolute value of the supply voltage applied to the supply member is greater than an absolute value of the development voltage applied to the developer carrying member.

3. The image forming apparatus according to claim 1, wherein, in the second period, an absolute value of the supply voltage applied to the supply member is smaller than an absolute value of the development voltage applied to the developer carrying member.

4. The image forming apparatus according to claim 1, wherein, in the second period, an absolute value of the supply voltage applied to the supply member is equal to an absolute value of the development voltage applied to the developer carrying member.

5. The image forming apparatus according to claim 1, wherein the development voltage applied to the developer carrying member in the second period is equal to the development voltage applied to the developer carrying member in the first period.

6. The image forming apparatus according to claim 1, wherein the first period includes a period in which image formation is performed on one recording material.

7. The image forming apparatus according to claim 1, wherein the second period is at least a part of a period between a period in which image formation is performed on one recording material and a period in which image formation is performed on the next recording material.

8. The image forming apparatus according to claim 7, wherein the first period includes a period, which is not included in the second period, between a period in which image formation is performed on one recording material and a period in which image formation is performed on the next recording material.

9. The image forming apparatus according to claim 1, wherein the second period is a period in which the developer carrying member rotates once.

10. The image forming apparatus according to claim 1, wherein a polarity of the supply voltage is equal to the regular polarity.

* * * * *